United States Patent
Yang

(10) Patent No.: US 6,234,429 B1
(45) Date of Patent: *May 22, 2001

(54) LIVING HINGE SNAP LOCK FOR WIRE HARNESS PROTECTOR

(75) Inventor: Shenghua Yang, Westland, MI (US)

(73) Assignee: Yazaki Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/432,932

(22) Filed: Nov. 3, 1999

Related U.S. Application Data

(63) Continuation of application No. 09/010,253, filed on Jan. 21, 1998, now Pat. No. 6,126,123.

(51) Int. Cl.⁷ .................................................. F16L 3/08
(52) U.S. Cl. .................................... 248/74.1; 248/68.1
(58) Field of Search .................................. 248/68.1, 74.1, 248/49, 74.2, 316.5; 174/135, 683; 24/543, 459, 339; 379/428; 292/38, 141, 162, 254; 70/69, 70, 71

(56) References Cited

U.S. PATENT DOCUMENTS

| | | | |
|---|---|---|---|
| 2,972,461 | * 2/1961 | Balbach | 248/68.1 |
| 4,857,670 | * 8/1989 | Frank | 174/68.3 |
| 5,653,003 | * 8/1997 | Freeman | 24/543 |
| 5,665,936 | * 9/1997 | Sawamura et al. | 174/32 |
| 5,709,249 | * 1/1998 | Okada et al. | 138/162 |
| 5,795,193 | * 8/1998 | Yang | 439/621 |
| 6,126,123 | * 10/2000 | Yang | 248/74.1 |
| 6,178,106 | * 8/1998 | Umemoto et al. | 363/146 |

* cited by examiner

Primary Examiner—Leslie A. Braun
Assistant Examiner—Gwendolyn Baxter
(74) Attorney, Agent, or Firm—Young & Basile, P.C.

(57) ABSTRACT

A wire harness protector comprises a trough having front and rear walls, a bottom wall, and a cover attached to the trough by a living hinge. The front wall of the trough has one or more locking tab sockets with lateral tab-receiving openings. At least one locking tab is connected to the front edge of the cover by a tab living hinge in alignment with the socket on the trough. Guide blocks are provided on the cover to automatically align the cover to the trough and each locking tab with each associated socket when the cover is closed on the trough. Each locking tab can be independently moved on its own living hinge into the front-facing lateral socket opening to independently lock all of the tabs on the cover in their sockets.

16 Claims, 4 Drawing Sheets

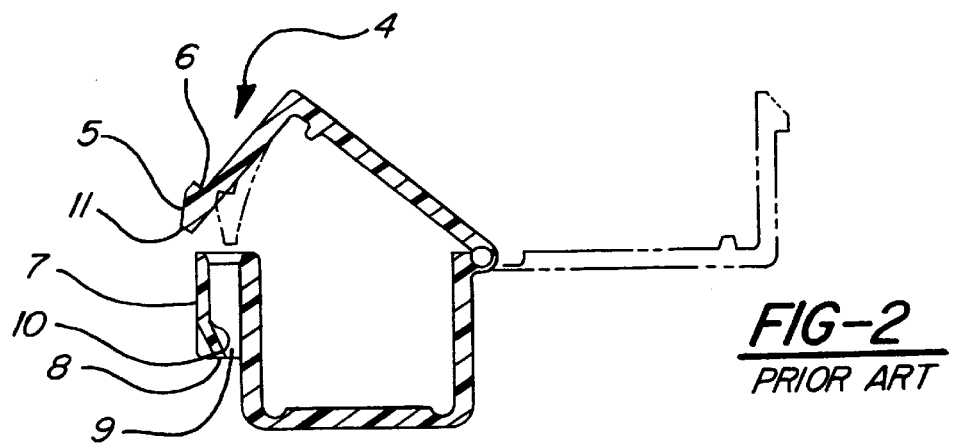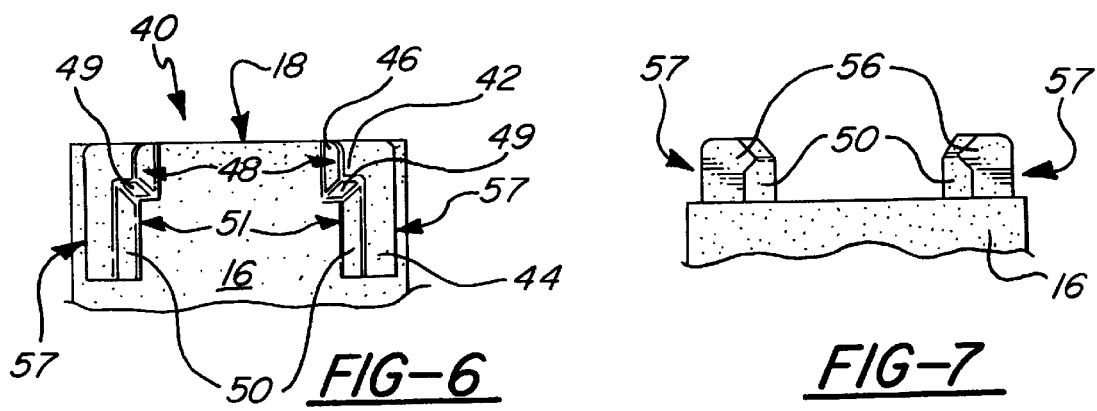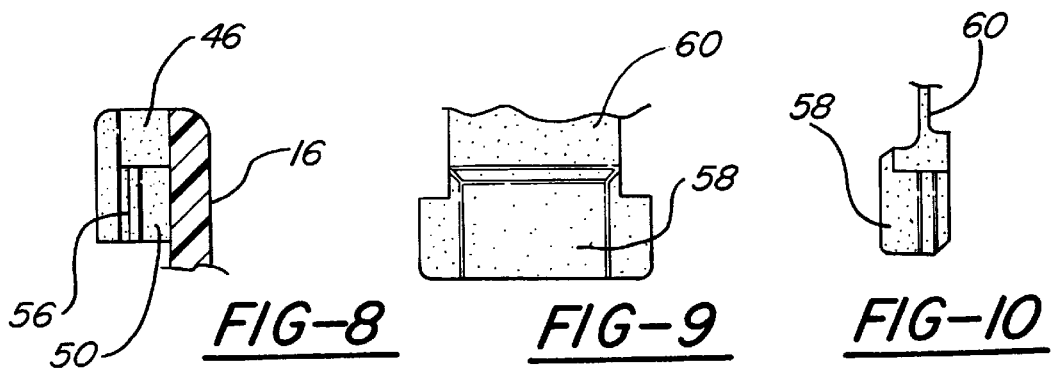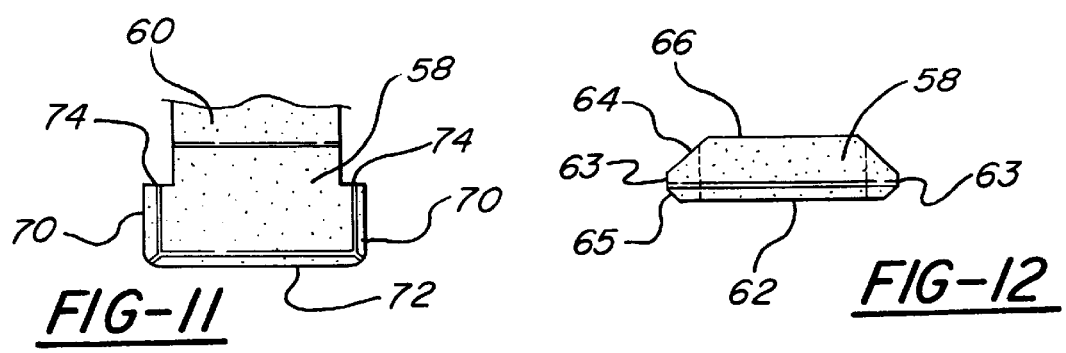

LIVING HINGE SNAP LOCK FOR WIRE
HARNESS PROTECTOR

RELATED APPLICATIONS

This application is a continuous application of application Ser. No. 09/010,253 filed Jan. 21, 1998 and issued on Oct. 3, 2000 as U.S. Pat. No. 6,126,123.

FIELD OF THE INVENTION

This invention relates in general to wire harness protectors and more specifically to locking structures for securing a cover on a wire harness protector.

BACKGROUND OF THEN INVENTION

Wire harnesses used in vehicle electrical systems are often shielded from contaminants such as water and dirt by protectors at selected positions along their lengths. Protectors are also used in locations where a wire harness might be subject to wear. Protectors may also serve as wire harness guides or to secure a harness to a vehicle body panel.

A typical prior art wire harness protector is shown in FIGS. 1 and 2. The protector comprises a base or trough 1 with front and back walls and a cover 2 connected to the back wall by a living hinge 3. Locking arms or tabs 4 extend downwardly from the front edge of cover 2. Each tab 4 typically has a beveled end 5 with a locking step 6. The front wall of the trough includes sockets 7 for receiving tabs 4. As cover 2 closes (shown in FIG. 2 in solid lines), locking tabs 4 must be flexed (phantom lines) to align them for simultaneous axial insertion into sockets 7. Tip 11 and beveled end 5 of each locking tab 4 briefly engage beads 8 to force angled steps 10 in sockets 7 outwardly while passing through the open lower end 9 of each socket, until steps 10 snap back into place on locking steps 6.

To open the wire harness protector of FIGS. 1 and 2, tabs 4 must be simultaneously pushed in toward the trough until locking steps 6 clear angled steps 10.

A disadvantage of the wire harness protector of FIGS. 1 and 2 is the requirement that tabs 4 be simultaneously operated to open and close the cover.

FIG. 3 illustrates another prior art wire harness protector having a trough 1 and a cover 2, formed as separate components. In this illustration, locking tabs 4 and sockets 7 are located on both the front and back walls of the trough. As in FIGS. 1 and 2, all tabs and sockets must be simultaneously operated and aligned before the cover can be closed, or opened. While locking tab alignment may be easier in closing the cover on the trough, the quality of alignment is dependent on the quality of the molding of the separate cover. Additionally, manufacturing the cover separately increases tooling and production costs and requires manual matching and dual stock keeping for the matched covers and troughs.

SUMMARY OF THE INVENTION

The present invention is an improved locking arrangement especially for a hinged-type wire harness protector cover, in which the locking tabs on the cover are automatically aligned with their respective sockets on the trough and can be locked and released independently.

In general, the invention is achieved by providing the wire harness protector cover with a plurality of locking tabs on its front edge, which tabs extend parallel to the cover and which are attached to the cover by living hinges. After the cover has been moved to its own closed position on the trough, each of the hinged locking tabs can be independently rotated to its own locking position in a socket on the trough. Rather than an axial insertion motion as required by the prior art, the locking tabs of the present invention engage the sockets in a lateral, face-on fashion as they are bent down on their hinges.

A further feature of the invention is a complementary alignment relationship between the sockets on the trough and guide blocks provided on the cover in association with each of the locking tabs.

A further feature of the invention is a pair of alignment ribs formed on the inside surface of the cover to help align and maintain the cover in the closed position, so that each locking tab can be independently rotated to its own closed position with a single finger without having to coordinate the locking tab operation with the cover-closing operation.

This invention, together with other objects, features, aspects and advantages thereof, will be more clearly understood from the following description, considered in conjunction with the accompanying drawings

BRIEF DESCRIPTION OF THE DRAWINGS

FIG. 2 is a cross-sectional side view of the prior art wire harness protector shown in FIG. 1;

FIG. 6 is a front view of a socket as shown in FIG. 4;

FIG. 7 is a bottom view of the socket of FIG. 6;

FIG. 8 is a cross-sectional side view of the socket of FIG. 6;

FIG. 9 is a view of the underside of a cover-mounted locking tab as shown in FIG. 4;

FIG. 10 is a side view of the locking tab of FIG. 9;

FIG. 11 is a view of the top surface of the locking tab of FIG. 9;

FIG. 12 is a view of the lower edge of the male locking tab of FIG. 9;

DETAILED DESCRIPTION OF THE PREFERRED EMBODIMENT

Figure 1:
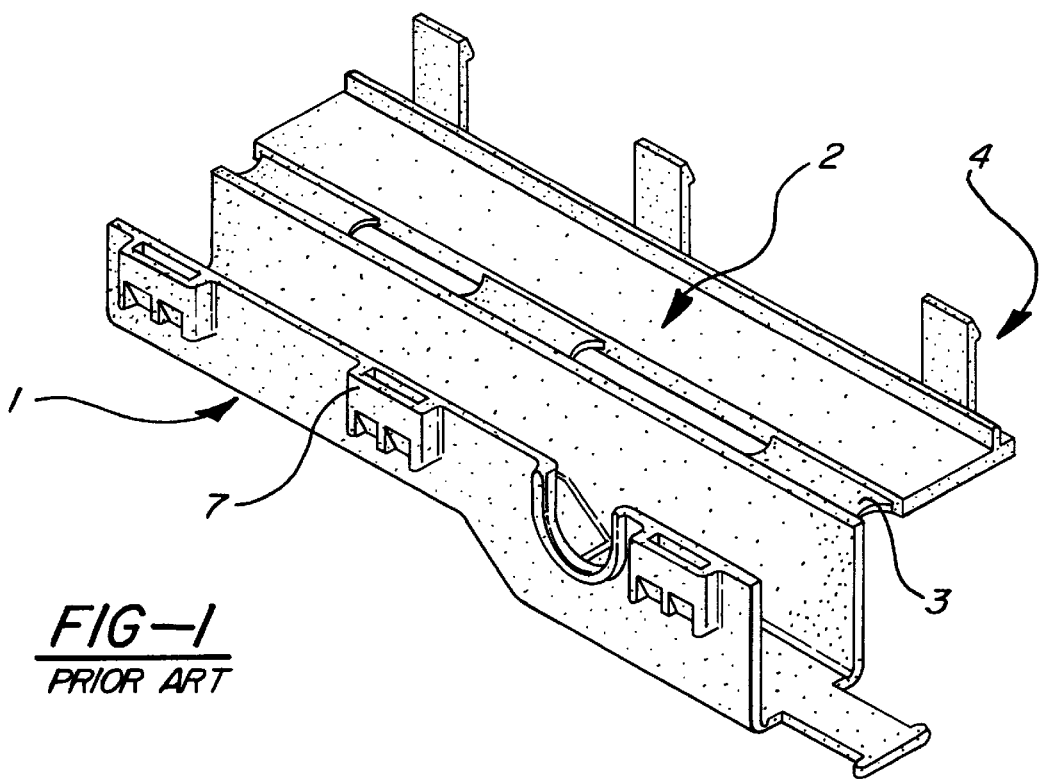
FIG. 1 is a perspective view of a prior art wire harness protector.
Figure 3:
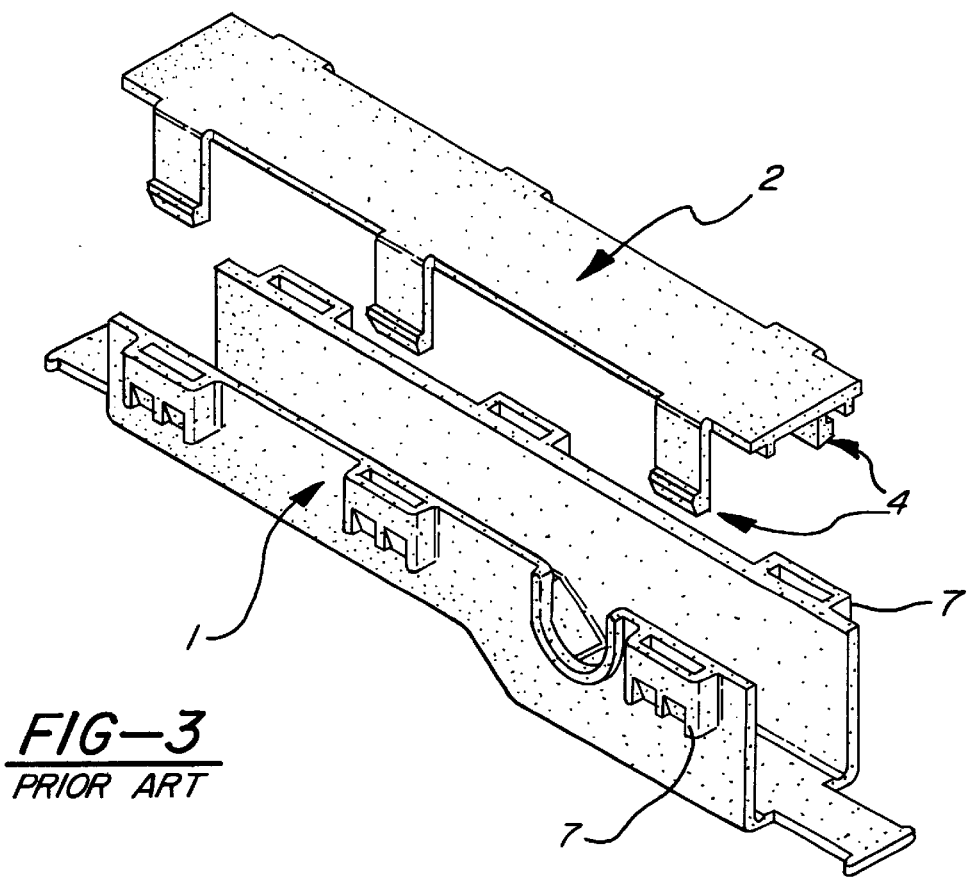
FIG. 3 is a perspective view of a second type of prior art wire harness protector.
Figures 4, 5:
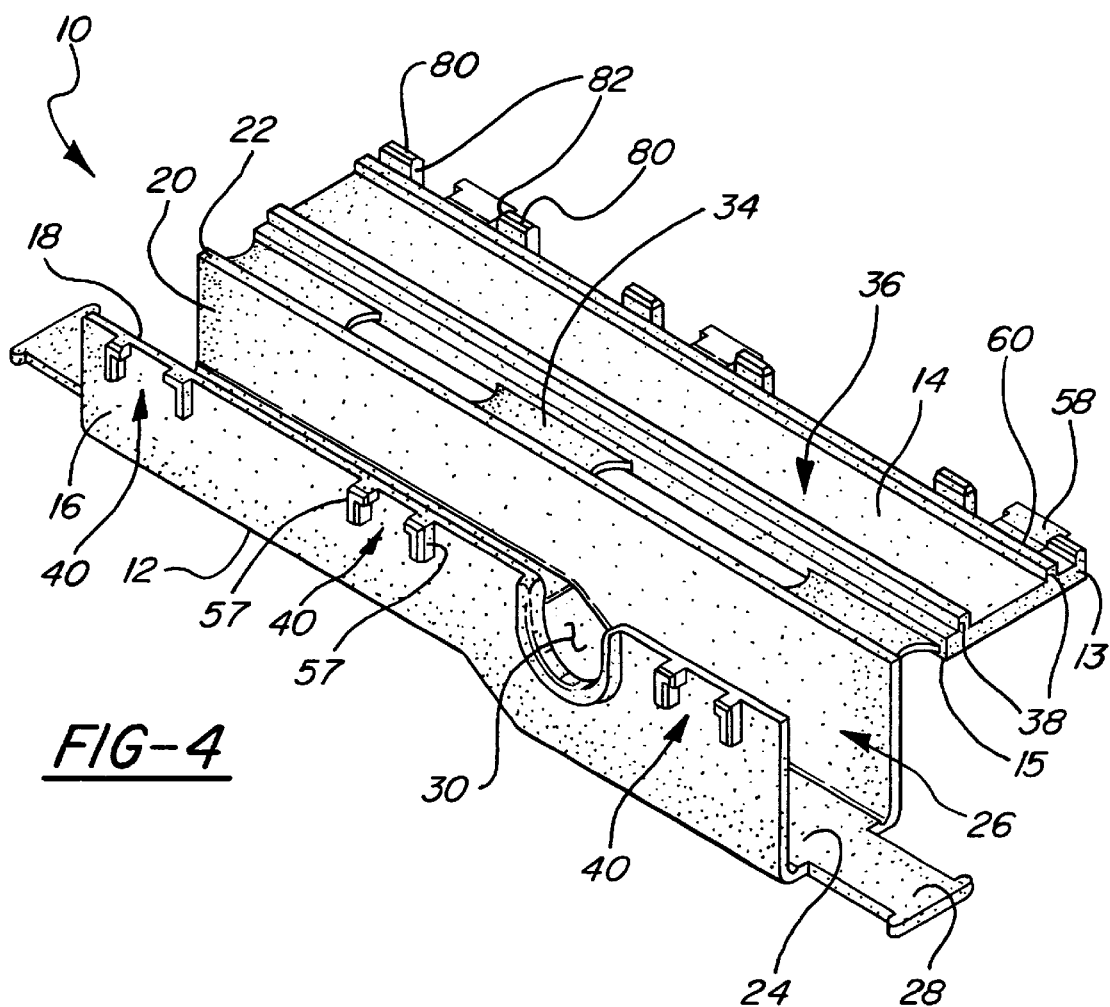
FIG. 4 is a perspective view of a wire harness protector according to the present invention.
FIG. 5 is a cross-sectional side view of the wire harness protector according to the present invention.

A wire harness protector 10 according to a first embodiment of the present invention is illustrated in FIGS. 4 through 12. Referring first to FIGS. 4 and 5, the protector is preferably molded from a suitable plastic known to those skilled in the art. The protector generally comprises a base or trough 12; front wall 16 and rear wall 20, with top front edge 18 and top rear edge 22, respectively; a bottom 24; and a hinged cover 14 having an interior surface 36 and front and rear edges 13 and 15. The ends 26 of trough 12 are open to receive a wire harness and may include mounting tabs 28 for securing a wire harness by taping. An opening 30 may be provided for branch wire harness take-out.

Cover 14 is preferably molded integrally with trough 12 and attached to rear trough wall 20 by a living hinge 34. Two longitudinal alignment ribs 38 are formed on interior cover surface 36 to align cover 14 with the front and rear walls of trough 12 as the cover is closed (see FIG. 5). Ribs 38 can also be spaced and shaped to create a friction fit with trough 12 to hold cover 14 closed until the locking tabs are engaged.

As shown generally in FIG. 4 and in detail in FIGS. 6, 7, and 8, the front wall of trough 12 includes female sockets 40 each defined by a pair of L-shaped legs. Beveled short faces 46 face each other and are separated by a first gap 48. Beveled long faces 50 face each other and are separated by a larger, second gap 51. A retaining ridge 56 protrudes from the lower end of each face 50. A step 49 is generally perpendicular to beveled faces 46 and 50.

As shown generally in FIG. 4 and in detail in FIGS. 9, 10, 11, and 12, cover 14 includes locking tabs 58 formed integrally with front edge 13 and connected thereto by independent living hinges 60. In the unlocked position, locking tabs 58 are generally parallel to cover 14. Each locking tab 58 generally comprises an essentially rectangular block having a top or push surface 66, a bottom surface 62, short sides 70, a long side 72 opposite living hinge 60, and shoulders 74. Beveled edges 64 and 65 meet to form a tab ridge 63 along short sides 70.

As shown in FIG. 4, pairs of guide blocks 80 are formed on the cover in surrounding association with the locking tabs 58. Guide blocks 80 serve to align the cover longitudinally on the trough due to their interfering fit with the outer edges of the sockets 40 in the cover's trough-closed position.

Referring now to FIG. 5, cover 14 is shown being closed on trough 12, pivoting on hinge 34 from the open position (phantom lines) to the closed position (solid lines). Alignment ribs 38 maintain fore and aft alignment of the cover on the trough. Once the cover is closed, locking tabs 58 are automatically aligned for independent, one-finger closure.

Using only a single finger, each locking tab can be locked to a corresponding socket on the trough by bending the locking tab down on its living hinge 60. This tab-closing motion is rotational and lateral or "face-on" with respect to the open-faced sockets on the trough, rather than an axial insertion as with the prior art. As each locking tab 58 is pressed into its associated socket 40, the above-described beveled surfaces of the L-shaped socket legs and the edges of the locking tabs are forced against one another in an interference fit, causing the plastic tabs and sockets to flex sufficiently that the locking tabs make a face-on snap fit with sockets 40. In particular, locking tab ridge 63 and locking tab shoulders 74 snap under retaining ridge 56 on the socket in a locked position from which the tab can be released only by an intentional outward pressure to pop the tab back out of the socket. The locking tabs cannot be pulled up axially from the sockets due to the withdrawal-preventing interference between tab shoulders 74 and socket steps 49.

In this fashion the locking tabs 58 can be individually and independently closed, eliminating the need to manually align or manipulate all the tabs simultaneously prior to closing.

To unlock the cover, each locking tab cab be individually and independently unlocked with an upward and outward prying motion exerted on the lower long edge 72 of each tab 58 until the tab pops out of its socket. This operation can be accomplished one tab at a time, much simpler than with previous protectors where every tab must be simultaneously manipulated and freed.

Figure 13:
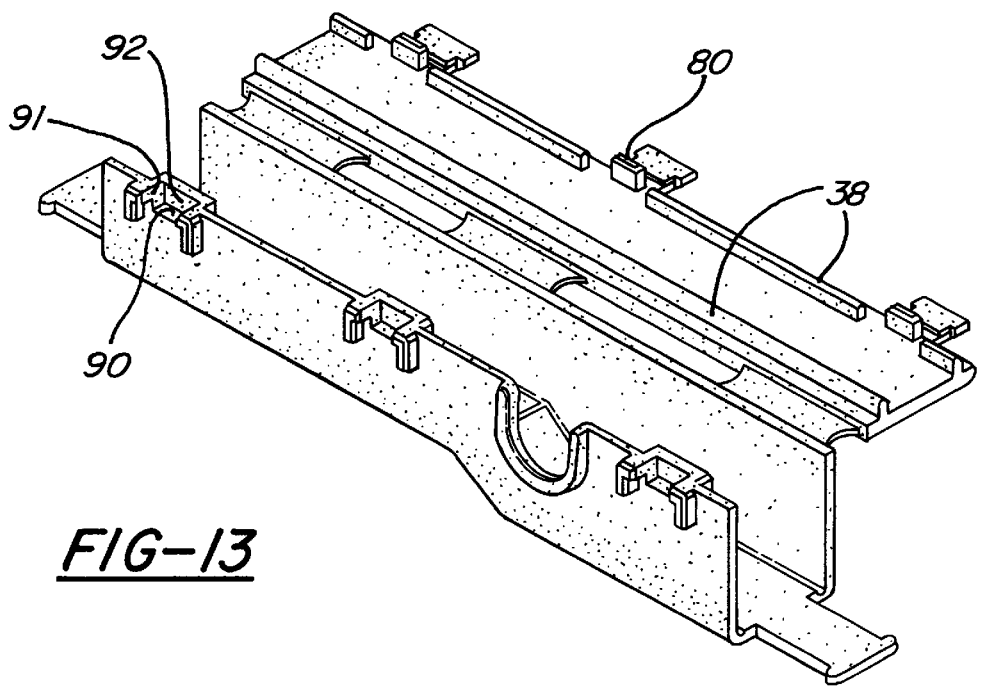
FIG. 13 is a perspective view of an alternate embodiment of the present invention.
Figure 14:
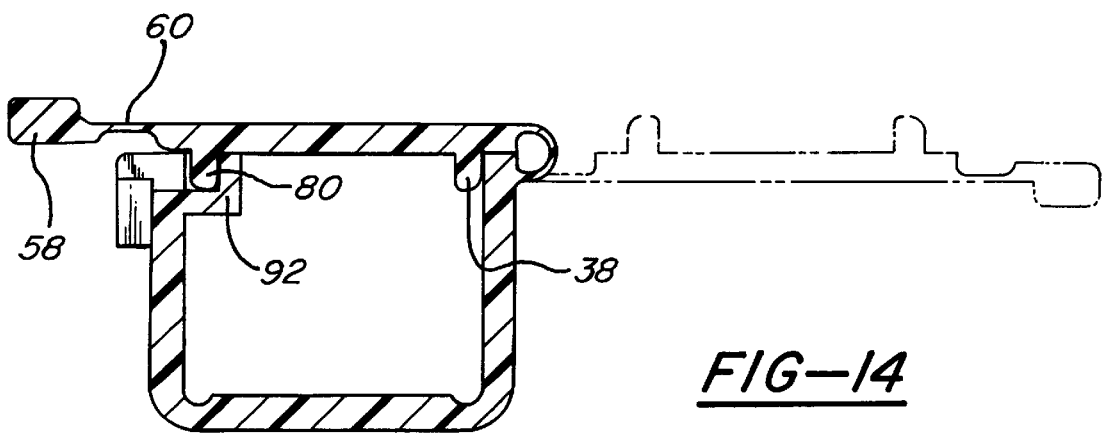
FIG. 14 is a cross-sectional side view of the alternate embodiment of FIG. 13.

Referring now to FIGS. 13 and 14, a second embodiment of the present invention is illustrated. Instead of two guide blocks bracketing each locking tab 58, a single guide block 80 extends perpendicularly down from cover 14 in alignment with each locking tab. Single blocks 80 interrupt the continuity of front edge alignment rib 38, located forward of the rib on the inside surface of the cover. Sockets 40 in this embodiment are provided with a rectangular alignment shelf 90 defined by side and back walls 91 and 92. Shelf 90 extends into the interior of the trough, inwardly from front wall 16.

In operation, as cover 14 is closed over trough 12 and alignment ribs 38 align the cover fore and aft on the trough, guide blocks 80 align the cover and locking tabs 58 longitudinally relative to the trough, due to a side-to-side motion-preventing fit with side walls 91. Offset single guide blocks 80 also help align the cover fore and aft in conjunction with ribs 3 8 by engaging back walls 92 of the alignment shelves 90 opposite front edge rib 38.

The closing and opening operations for the locking tabs 58 in FIGS. 13 and 14 are otherwise the same as for FIGS. 4–12.

Since minor changes and modifications varied to fit particular operating requirements and environments will be understood by those skilled in the art, this invention is not considered limited to the specific examples chosen for purposes of illustration. The invention is meant to include all changes and modifications which do not constitute a departure from the true spirit and scope of this invention as claimed in the following claims and as represented by reasonable equivalents to the claimed elements. Accordingly,

I claim:

1. A wire harness protector comprising:

a trough having a front wall and a rear wall, the front wall having at least one locking tab socket formed on an outside face thereof, the socket comprising a lateral tab-receiving opening facing in a direction generally perpendicularly away from the front wall;

a cover having a front edge and a rear edge, the rear edge of the cover attached to the rear wall of the trough by a hinge and adapted to be hinged to a closed position covering the trough; and a locking tab connected to the front edge of the cover by a living hinge, the locking tab extending from the cover on the living hinge with a bottom surface held away from the front wall of the trough when the cover is in the trough closed position, the locking tab being positioned on the cover in alignment with the socket, the locking tab being movable about its living hinge into the lateral tab-receiving opening in the socket to a locked position in face-on fashion with the bottom surface of the locking tab entering the socket in a lateral direction generally perpendicular to the front wall of the trough, the locking tab and socket further including mating surfaces which lock the tab into the socket in the locked position generally perpendicular to the cover in the trough closed position.

2. The wire harness protector of claim 1, wherein the trough includes two or more spaced locking tab sockets on the front wall, and the cover includes two or more spaced locking tabs formed on the front edge in alignment with the sockets on the trough when the cover is in the trough closed position.

3. The wire harness protector of claim 2, wherein the cover includes longitudinal alignment ribs on an inside surface thereof which engage inside surfaces of the front and rear walls of the trough.

4. The wire harness protector of claim 1, wherein the cover includes a guide block on each side of the locking tab, the guide blocks extending downwardly from the cover to axially engage side surfaces of the locking tab socket when the cover is moved to the trough closed position, thereby aligning the locking tab with the socket.

5. A wire harness protector comprising:

a trough having front, rear and bottom walls, the front wall having at least one open-faced locking tab socket formed on an outside face thereof, the socket comprising a lateral tab-receiving opening adapted to receive a locking tab in a lateral mating direction generally perpendicular to the front wall of the trough;

a cover having a front edge and a rear edge, the rear edge of the cover being connected to the rear wall of the trough by a living hinge opposite the socket on the front wall of the trough, the cover adapted to be moved on its living hinge to a trough closed position, the cover further including a locking tab connected to the front edge of the cover in alignment with the socket in the trough closed position, the locking tab connected to the cover by a tab living hinge extending generally perpendicular to the front wall of the trough in the trough closed position, the locking tab being adapted to be moved in a downward rotational and lateral movement on its tab living hinge into the lateral tab-receiving opening in the socket to a locked position in the socket in which the tab is generally perpendicular to the cover in the trough closed position.

6. The wire harness protector of claim 5, further including at least one guide block associated with each locking tab on the cover, the guide block extending downwardly from the front edge of the cover so as to mate axially with a portion of the socket associated with the locking tab when the cover is moved to the trough closed position.

7. The wire harness protector of claim 6, wherein each locking tab is provided with two guide blocks, one guide block being located on each side of the locking tab.

8. The wire harness protector of claim 6, wherein each locking tab is provided with one guide block aligned with the locking tab.

9. A wire harness protector comprising:

a trough having a front wall and a rear wall, the front wall having at least one locking tab socket formed on an outside face thereof, the socket comprising a lateral tab-receiving opening facing in a direction generally perpendicularly away from the front wall;

a cover having a front edge and a rear edge, the rear edge of the cover attached to the rear wall of the trough by a hinge and adapted to be hinged to a closed position covering the trough; and a locking tab connected to the front edge of the cover by a living hinge, the locking tab extending generally parallel from the cover on the living hinge with a bottom surface held away from the front wall of the trough when the cover is in the trough closed position, the locking tab being positioned on the cover in alignment with the socket, the locking tab being movable about its living hinge approximately one right-angle turn into the lateral tab-receiving opening in the socket to a locked position in face-on fashion with the bottom surface of the locking tab entering the socket in a lateral direction generally perpendicular to the front wall of the trough, the locking tab and socket further including mating surfaces which lock the tab into the socket in the locked position generally perpendicular to a plane of separation of the cover from the trough.

10. The wire harness protector of claim 9, wherein the trough includes two or more spaced locking tab sockets on the front wall, and the cover includes two or more spaced locking tabs formed on the front edge in alignment with the sockets on the trough when the cover is in the trough closed position.

11. The wire harness protector of claim 9, wherein the cover includes longitudinal alignment ribs on an inside surface thereof which engage inside surfaces of the front and rear walls of the trough.

12. The wire harness protector of claim 9, wherein the cover includes a guide block on each side of the locking tab, the guide blocks extending downwardly from the cover to axially engage side surfaces of the locking tab socket when the cover is moved to the trough closed position, thereby aligning the locking tab with the socket.

13. A wire harness protector comprising:

a trough having front, rear and bottom walls, the front wall having at least one open-faced locking tab socket formed on an outside face thereof, the socket comprising a lateral tab-receiving opening adapted to receive a locking tab in a lateral mating direction generally perpendicular to the front wall of the trough;

a cover having a front edge and a rear edge, the rear edge of the cover being connected to the rear wall of the trough by a living hinge opposite the socket on the front wall of the trough, the cover adapted to be moved on its living hinge to a trough closed position, the cover further including a locking tab connected to the front edge of the cover in alignment with the socket in the trough closed position, the locking tab connected to the cover by a tab living hinge extending generally perpendicular to the front wall of the trough in the trough closed position, the locking tab being adapted to be moved in a downward rotational and lateral movement on its tab living hinge approximately one right angle turn into the lateral tab-receiving opening in the socket to a locked position in the socket in which the tab is generally perpendicular to a plane of separation of the cover from the trough.

14. The wire harness protector of claim 13, further including at least one guide block associated with each locking tab on the cover, the guide block extending downwardly from the front edge of the cover so as to mate axially with a portion of the socket associated with the locking tab when the cover is moved to the trough closed position.

15. The wire harness protector of claim 14, wherein each locking tab is provided with two guide blocks, one guide block being located on each side of the locking tab.

16. The wire harness protector of claim 14, wherein each locking tab is provided with one guide block aligned with the locking tab.

* * * * *